US010171756B2

(12) United States Patent
Moore et al.

(10) Patent No.: US 10,171,756 B2
(45) Date of Patent: Jan. 1, 2019

(54) IMAGE-BASED LOCALIZATION OF ULTRAVIOLET CORONA

(71) Applicant: The United States of America, as represented by the Administrator of the National Aeronautics and Space Administration, Washington, DC (US)

(72) Inventors: Andrew J. Moore, Williamsburg, VA (US); Matthew R. Schubert, Newport News, VA (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 268 days.

(21) Appl. No.: 15/139,808

(22) Filed: Apr. 27, 2016

(65) Prior Publication Data
US 2017/0318236 A1    Nov. 2, 2017

(51) Int. Cl.
G06T 3/00    (2006.01)
H04N 5/33    (2006.01)
H04B 7/185   (2006.01)

(52) U.S. Cl.
CPC ............ *H04N 5/33* (2013.01); *G06T 3/0087* (2013.01); *G06T 2207/10032* (2013.01); *G06T 2207/10048* (2013.01); *H04B 7/18506* (2013.01)

(58) Field of Classification Search
CPC .... H04N 5/33; H04B 7/18506; G06T 3/0087; G06T 2207/10032; G06T 2207/10048
See application file for complete search history.

(56) References Cited

U.S. PATENT DOCUMENTS 4,818,990 A * 4/1989 Fernandes .............. G01R 15/14
                                                340/12.32
6,509,750 B1 * 1/2003 Talbot ................... G06T 7/0004
                                                324/754.22

(Continued)

OTHER PUBLICATIONS

Van Veldhuizen, E.M., et al., "Corona discharges: fundamentals and diagnostics," Proceedings Frontiers Low Temperature Plasma Diagnostics (2001), 10 pages.

(Continued)

*Primary Examiner* — Nhon T Diep
(74) *Attorney, Agent, or Firm* — Andrea Z. Warmbier; Robin W. Edwards; Mark P. Dvorscak

(57) ABSTRACT

Systems and methods for identifying a fault in an electrical distribution system may include capturing an image of a corona event associated with a component of the electrical distribution system and processing the image of the corona event to identify the center and boundary of the corona event. An overlay for display with the image of the corona event may be generated, where the overlay identifying at least a center of the corona event and may be displayed to a user via a user interface device. In some cases, an unmanned aerial vehicle may comprise one or more image sensors capable of capturing the image of the corona event and communicate the images to a remote device for processing and display to the user. The image captured by the image sensors may include an ultraviolet image, a visible spectrum image, an infrared image, or a combination of image types.

13 Claims, 11 Drawing Sheets

(56) References Cited

U.S. PATENT DOCUMENTS

| | | | | |
|---|---|---|---|---|
| 6,620,347 | B1* | 9/2003 | Lo Iacono | C01B 9/08 |
| | | | | 117/928 |
| 6,788,338 | B1* | 9/2004 | Dinev | H04N 5/2258 |
| | | | | 348/222.1 |
| 8,781,158 | B1 | 7/2014 | Frisch et al. | |
| 9,774,797 | B2* | 9/2017 | Richards | H04N 7/188 |
| 2005/0034655 | A1* | 2/2005 | Lo Iacono | C01B 9/08 |
| | | | | 117/200 |
| 2016/0344981 | A1* | 11/2016 | Lunt | G01C 3/08 |
| 2017/0285092 | A1* | 10/2017 | Moore | G01R 31/1218 |

OTHER PUBLICATIONS

Niemeyer, L. et al., "Fractal Dimension of Dielectric Breakdown," Physical Review Letters (1984), vol. 52, No. 12, 5 pages.

Limin, Y., "Ultraviolet Image Processing Method in Corona Detection," Second International Workshop on Computer Science and Engineering (2009), 5 pages.

Kim, Y. et al., "The Characteristics of UV Strength According to Corona Discharge from Polymer Insulators Using a UV Sensor and Optic Lens," IEEE Transactions on Power Delivery, (2011) vol. 26, No. 3, pp. 1579-1584.

Hu, B. et al., "New corona ultraviolet detection system and fault location method," China International Conference on Electricity Distribution (2012), 4 pages.

Engelhaupt, D. et al. "Autonomous long-range open area fire detection and reporting," Thermosense XXVII, Proceedings of SPIE, (2005), vol. 5762, pp. 164-175.

Peek, Jr., F.W. "Dielectric Phenomena in High Voltage Engineering," 2nd edition, McGraw-Hill, (1920), 320 pages.

Austen, A.E.W., et al., "Discharges in Insulation Under Alternating-Current Stresses," J. Inst. Electr. Eng. III 88, (1941), 7 pages.

Kunhardt, E.E., "Electrical Breakdown of Gases: The Prebreakdown Stage," IEEE Transactions of Plasma Science, (1980), vol. PS-8, No. 3, pp. 130-138.

Shong, K. et al., "Images Detection and Diagnosis of Corona Discharge on Porcelain Insulators at 22.9 kV D/L," IEEE International Symposium on Diagnostics for Electric Machines, Power Electronics and Drives, (2007), pp. 462-466.

\* cited by examiner

IMAGE-BASED LOCALIZATION OF ULTRAVIOLET CORONA

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

In electrical power transmission systems, great care is taken to avoid possible configurations (e.g., sharp protrusions on structures that are on or near high voltage conductors) that may cause a local concentration (e.g., a high electrical potential point) of electric field that may exceed the threshold for coronal discharge. Electron avalanches that may result from such high-potential points may produce, such as via impact ionization and subsequent recombination of atmospheric plasma, an ultraviolet (UV) photon spray or coronal discharge. While most coronas are benign, some may be indicative of severe degradation of equipment that would require immediate attention. As such, procedures that may be used locate, diagnose, and classify coronas are often considered to be a useful component of a transmission line inspection process. However, such processes may often be used infrequently for cost reasons (e.g., human inspection of UV-band imagery, etc.) and/or difficulty of image capture, particularly in remote locations. As such, a need has been recognized for a lower cost image generation system and/or an automated image analysis system to allow for more frequent inspection of power transmission infrastructure.

BRIEF SUMMARY OF THE INVENTION

The present invention relates to monitoring of electron cascades from electrical discharge which produce secondary emissions from atmospheric plasma in the ultraviolet band. In some cases, such as for a single point of discharge, these emissions may exhibit identifiable discharge morphology that may be analyzed to identify latent information about the discharge location. Morphological processing may be used to determine the discharge location, which may be used to diagnose problems in large, or small, electrical systems One embodiment of the invention is a method for identifying a fault in an electrical distribution system may include capturing an image of a corona event associated with a component of the electrical distribution system and processing the image of the corona event to identify the center and boundary of the corona event. An overlay for display with the image of the corona event may be generated, where the overlay identifying at least a center of the corona event and may be displayed to a user via a user interface device. In some cases, an unmanned aerial vehicle may comprise one or more image sensors capable of capturing the image of the corona event and communicate the images to a remote device for processing and display to the user. The image captured by the image sensors may include an ultraviolet image, a visible spectrum image, an infrared image, or a combination of image types.

These and other features, advantages, and objects of the present invention will be further understood and appreciated by those skilled in the art by reference to the following specification, claims, and appended drawings.

DETAILED DESCRIPTION OF THE INVENTION

Figure 1:
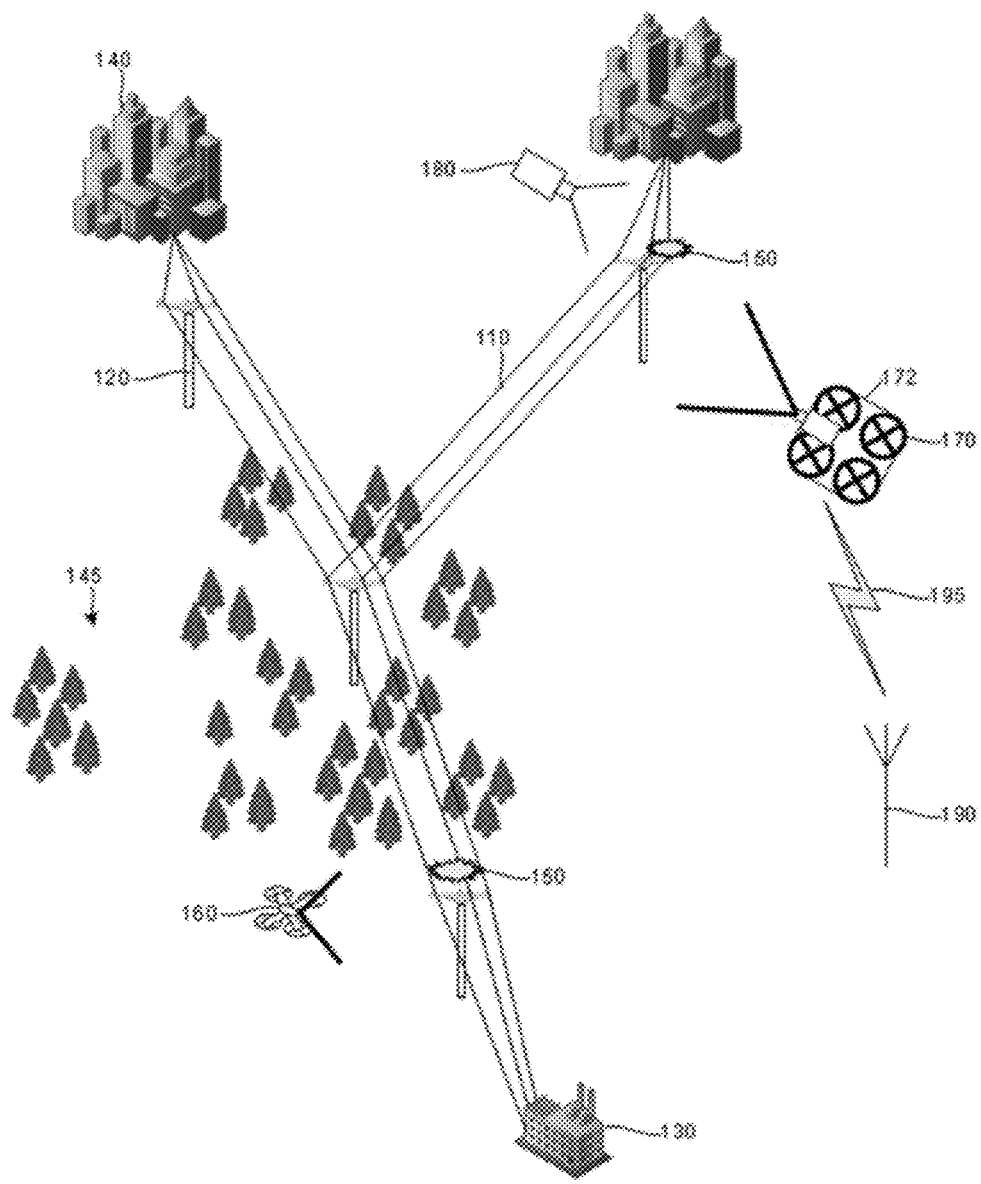
FIG. 1 shows an illustrative block diagram of an electric power transmission system being monitored for faults according to aspects of the disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIG. 1, an electrical power transmission system 100 may include a long distances of electric power lines 110 (e.g., transmission lines, overhead lines, etc.) held aloft by a plurality of transmission line towers 120 to provide electrical power between an electrical power generation system 130 (e.g., a power station, a renewable energy electrical power source, etc.) and users (e.g., residents of the city 140) of the electrical power (e.g., a city, a home, roadway systems, airports, electric vehicle systems such as an electric-powered commuter train system, etc.). The electrical power transmission system may include one or more public infrastructure elements (e.g., trolleys, electric locomotives, levees, bridges, dams, and the like) and/or public infrastructure elements (e.g., the transmission lines 110, cargo ports, rail lines, rail yards, pipelines, roadways, and the like). In many cases, the electric power lines 110 may traverse populated areas, such as the city 140, and lesser populated areas 145 (e.g., unincorporated land, forests, parklands, wilderness areas, and/or the like). The electrical power transmission line system may also include other structures or installations in use to facilitate electrical power transmission from an electrical power supplier to a user of electrical energy, such as substations, pole transformers, etc. In an illustrative example, the electric power transmission system may be configured such that an electrical power generation system 130 may generate electrical energy that may provide electrical energy to the electric power grid. In many cases, transformers at a generation plant may be used to increase the voltage up to a particular transmission voltage (e.g., 69 kV, 115 kV, 230 kV, 500 kV, 765 kV, etc.) for transmission over high-voltage transmission lines, such as for transmission over longer distances. One or more electrical substations may include transformers to reduce electrical energy down to a lower voltage (e.g., 69 kV, 34 kV, etc.) for high volume delivery over shorter distances such as to large industrial users who may use their own substation to convert electric power to voltages usable within an industrial complex. In some cases, a local distribution substation may reduce electric energy to voltage levels (e.g., 480V, 240V, 120V, etc.) typically used by lower volume users (e.g., homes, schools, small businesses, farms, etc.). Due to the large area covered and the number of components installed as part of the electrical power transmission system 100, faults are likely to occur and disrupt delivery of electrical power. For example, a fault, such as a short between voltages of different potentials (e.g., line to ground, phase to phase, etc.) may occur due to one or causes such as fatigue, external forces (e.g., fallen limb, animal interaction, etc.) forces of nature (wind, flood, etc.). In many cases, a fault on the electrical power transmission system 100 may be indicated by a corona 150.

Figure 3:
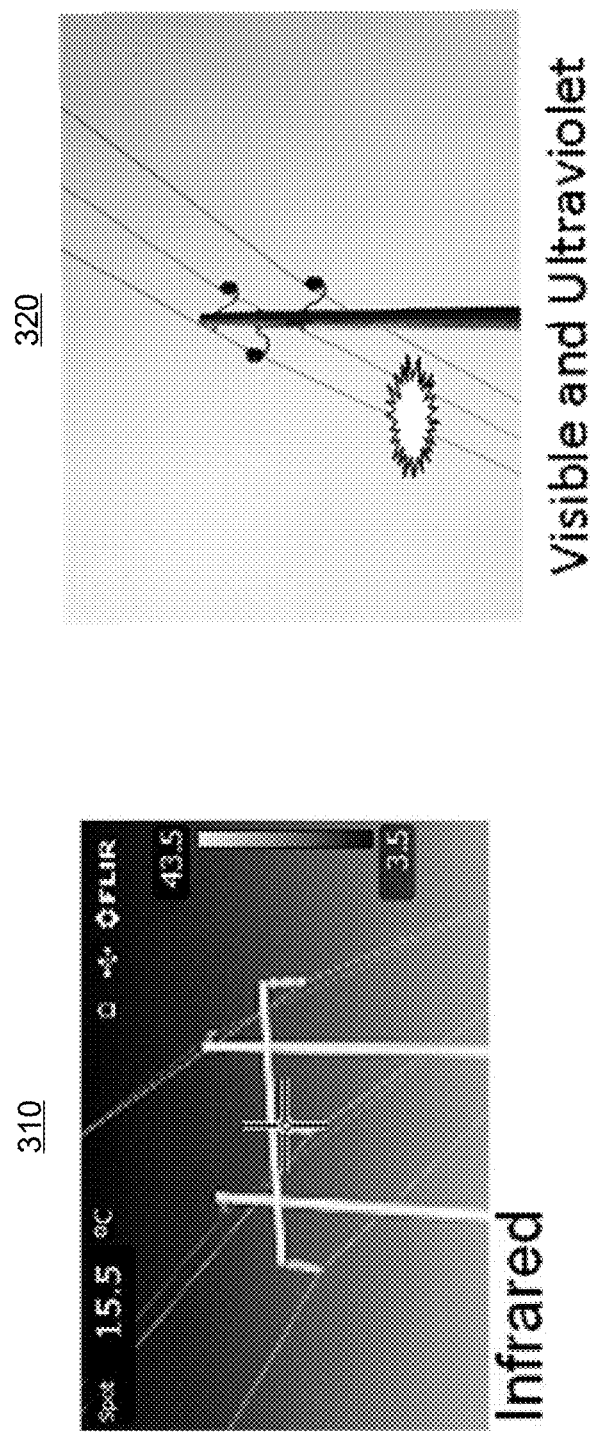
FIG. 3 shows illustrative images that may be captured using one or more different imaging devices according to aspects of the disclosure.

As such, monitoring and detection of electrical faults, such as electrical faults that may be indicated by the corona 150, may be difficult because the complete electrical power transmission system 100 is complex and may cover an extremely large area cannot be visually monitored continuously. In person inspection is cost-prohibitive as large numbers of individuals would need to be employed and equipped to monitor portions of the transmission line system. As such, a need has been recognized for a lower cost image generation system and/or an automated image analysis system to allow for more frequent inspection of power transmission infrastructure. For example, a cost-efficient automated or semi-automated system and method for providing inspection of the electrical power transmission system 100 may be made possible through the use of low-cost image capture and automated image analysis of the captured images, such as by using an unmanned aerial vehicle (UAV) 160, 170 equipped with an imaging device 180 (e.g., a still camera, a video camera, a photodetector, etc.) capable of capturing images in the visible light spectrum, infrared spectrum, ultraviolet spectrum and/or through the use of other imaging devices (e.g., a light detection and ranging (LIDAR) device. In some cases, one or more imaging devices 180 may be located in a fixed location, or a location having a limited range of movement such as to monitor areas in which a UAV or other vehicle-based imaging system may not be capable of easily capturing a usable image. FIG. 3 shows illustrative images that may be captured using one or more different imaging devices including infrared, ultraviolet, visible light and LIDAR based imaging devices, or a combination of devices (e.g., combined UV and visible light images, etc.). For example image 310 is an image captured using an infrared imaging device and image 320 corresponds to an image including information captured using a visible light imaging device and an ultraviolet light imaging device.

In an illustrative example, a UAV may be equipped with a UV imaging device which may or may not be combined with the use of a visible light imaging device. UV imaging devices may have a maximum UV sensitivity of between $1.0 \times 10^{-18}$ W/cm$^2$ to about $3 \times 10^{-18}$ W/cm$^2$. In some cases, the imaging device may provide "solar blind" and/or "night mode" operating modes to overcome ambient UV light (e.g., sunlight intensity, etc.). The UV imaging devices may be capable of detecting a minimum UV discharge from about 1.5 pC at 8 meters to 1 pC at 10 meters to about 3 pC at 20 meters. In some cases, an imaging device may have a first minimum discharge detection level in a solar blind operation mode (e.g., 3 pC at 20 meters) and a second minimum detection level in night mode operation (e.g., 0.75 pC at 10 meters). The values given are illustrative values and are not meant to be limiting in any way. Further, the imaging devices may have a defined field of view based on the configuration of the imaging device, where the field of view may be between about 5.0°×3.75° and 8.0°×6.0°. In some cases, an imaging device's field of view may change based on an image capture mode. For example, an imaging device may have a first field of view for a first operating mode (e.g., 5.0°×3.75°) and a second field of view for a second operating mode (e.g., 10.0°×7.5°). In some cases, an operating mode may correspond to a single image capture type (e.g., UV, IR, visible spectrum, etc.) or a combined operating mode, such as a combined IR and visible light capturing mode). Resolution of the images may vary based on a size of a captured image (e.g., selected based on available memory resources) and/or on physical limitations of the image sensors and/or filters (e.g., a "honeycomb" image intensifier) being used. In certain applications, such as applications designed to meet cost, size and/or weight requirements, a photodiode (e.g., a UV photodiode may be used to capture a UV image, such as by using a miniature-sized UAV, such as UAV 160, where larger devices, or more devices may be installed on a larger scale UAV, such as UAV 170. The UV photodiode may be installed for vertical or horizontal viewing, where the associated field of view may differ based on the orientation of the UV photodiode when installed.

Transmission line towers 120 may utilize one of many designs (e.g., lattice type structures, single columnar structures, double columnar structures, H-type frame structures, guyed V-type structures, guyed Y-type structures, etc.). The transmission lines 110 may be insulated from the transmission line towers 120 through the use of electrical insulators (e.g., ceramic insulators, etc.) the type, number and size of the insulators used in a particular system may be dependent upon the associated voltage of the electrical power being transmitted over a particular length of the electrical power lines. In general, the design of the electrical power transmission system may be chosen, over a particular distance, based on the character of the line route, right of way, mechanical loading factors, required clearances, the supporting structure types, grade of construction, a conductor size or material type, types of insulators, joint use by multiple utilities, and/or other such factors. In some cases, use of a particular tower type, insulator type, number of insulators and the like may provide insight into a voltage associated with the electrical power being transmitted at a particular location. This information may, in some cases, be used when analyzing captured coronal events.

The dielectric response to a high electric (E) field is a complex, multi-regime phenomenon, particularly when the field arises from an alternating (e.g., 60 Hz) source. In some cases, cathodal and/or anodal coronas may initiate, propagate and extinguish in each positive and negative half-cycle of alternation. This disclosure describes a process where morphological processing may be used to automate ultraviolet-band (UV-band) corona analysis in the static discharge regime in which the dielectric is air and in which the field gradient is insufficient, for a fixed source-to-sink distance, to produce spark-over or conductive shorting. In an illustrative example, coronal ionization and/or recombination sites decrease monotonically with distance r from the initiation point. Further, in a planar projection into the viewport of a UV imager, the photon distribution of the coronal ionization appears as a solid ball of emission in the nucleus and as a speckled halo in the periphery.

Since the peripheral emission sites appear as "blobs" with an area much smaller than the center site, a simple erode-AND operation may be used to extract the center. However, in electrical inspection, visible-band imagery may be used to determine the corona cause, often with respect to the context of the corona. For example, when located adjacent to a high-voltage conductor, surface conditions in the area surrounding the corona center are often of diagnostic value. As such, methods that remove information about the corona radius may be used but, in some cases, are of limited utility. As discussed in more detail below, the methods and systems discussed herein may be used to determine the corona center, to determine the entire extent of the corona emission image, or both determine the corona center and the extent of the corona emission image.

In an illustrative example, a first center-finding method may use temporal averaging to accomplish, via a time domain, an analog to spatial erosion method, such as the one illustrated in "New corona ultraviolet detection system and fault location method" by B. Hu, L-X. Ma, S-J Yuan, and B. Yang, in Electricity Distribution (CICED), 2012 China International Conference on, (IEEE, 2012), pp. 1-4, which is included herein in its entirety, but particularly for the description of an analog to spatial erosion method in the time domain. In general, such as for common camera settings, averaging frames over 1 second of 30 fps video may be sufficient to robustly lower the average intensity of peripheral emission sites, but other such averaging and/or video playback speeds may be used. Here, a blob test based on area and circularity may be followed by a persistence threshold θ removes all sites except the center, and uniquely identifies the center coordinates.

$$C(x,y) = \int_t \{\text{Area}[I(x,y)] > A_{min}\} > \theta \quad (1)$$

If the UV imager viewport is not stable, this method may suffer from distortions.

A second center-finding method may be used to count the number of maxima of image intensity after Gaussian blurring, $$C(x, y) = \max_{x,y}[G_\sigma(x, y) \otimes I(x, y)] \quad (2)$$

by increasing kernel width σ until the count stabilizes to one such that the maximum may be taken as the center of the corona. A related center-finding method conditions the increase in σ on locational stability of maxima. However, at low σ, this method may falsely reports maxima at each site of peripheral emission, if the corona nucleus is not in the field of view.

Corona extent varies with the gain of the UV imager multichannel plate. To diagnostically determine a discharge location, human inspectors may i) start with a relatively high gain to find discharge figures, ii) lower the gain to remove stray ambient emissions and, if a characteristic radial morphology is recognized, iii) center the camera view on the coronal nucleus, and iv) lower the gain further until only the center is visible and take a snapshot in the visible band with the UV nucleus overlaid. This sequence may be based on the broadly reliable assumption that the corona nucleus is coincident with the high E field initiation point of the discharge, which effectively pinpoints the center within a diagnostic context.

Figure 2A:
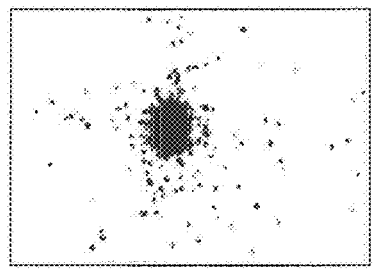
FIGS. 2A, 2B, 2C, 2D, 2E and 2F show illustrative images captured of coronal events and illustrative images to be shown to a user via a user interface device according to aspects of the disclosure.
Figure 2A:
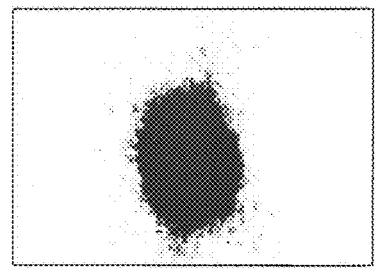
Figure 2B:
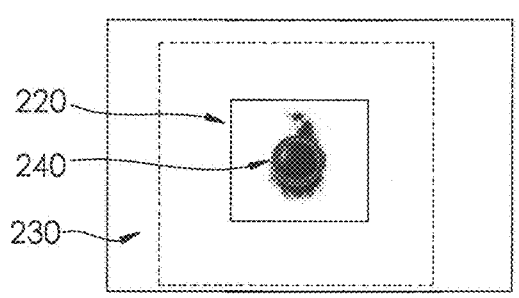
Figure 2B:
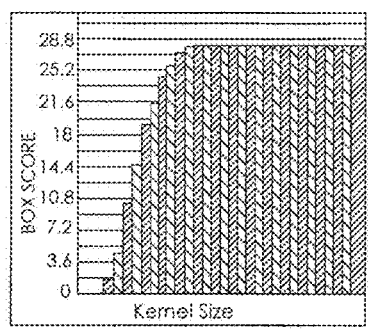
Figure 2C:
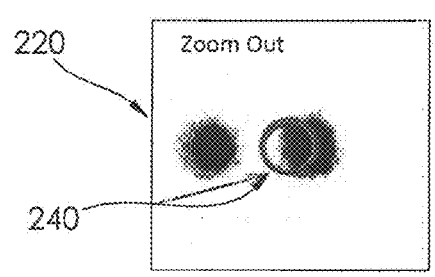
Figure 2C:
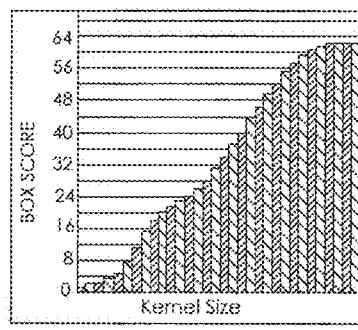

To derive a computational basis with which to mimic the third and fourth steps of this behavior, an intermediate representation of corona morphology was created by applying a series of difference of box (DoB) filters with increasing size d, centered at the corona nucleus, as shown in FIGS. 2A-2F. In this representation, if the DoB is balanced and the UV image is binary, the shape of the DoB score through scale indicates discharge isolation and morphological coherence. The positive extent of the DoB (as shown in the inner or solid boxes 220 in FIGS. 2A-2F is a suitable frame for a detail snapshot in the visible band, while the negative extent (e.g., outer or dashed boxes 230 in FIGS. 2A-2F) frames the contextual snapshot and can be used to prompt an operator to zoom out to capture the full diagnostic context, as shown in FIG. 2C.

Figure 2D:
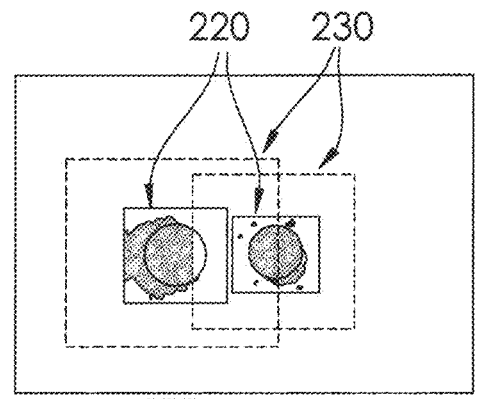
Figure 2D:
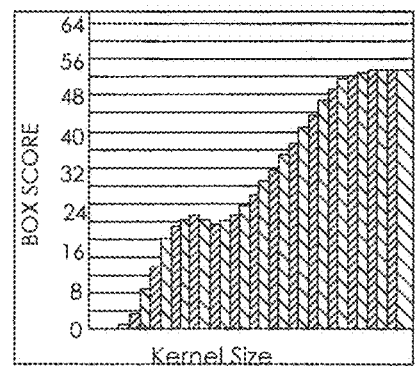
Figure 2E:
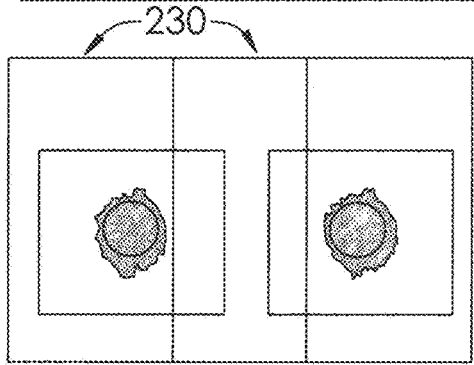
Figure 2E:
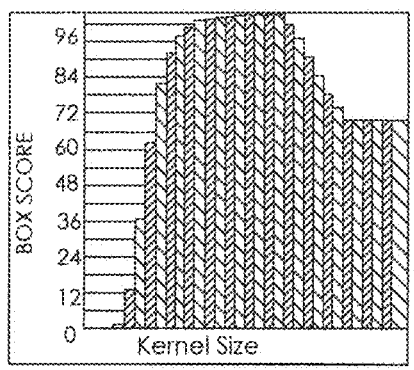
Figure 2F:
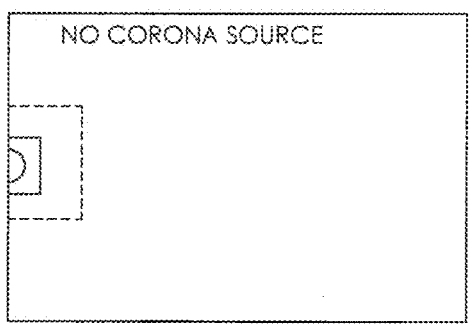
Figure 2F:
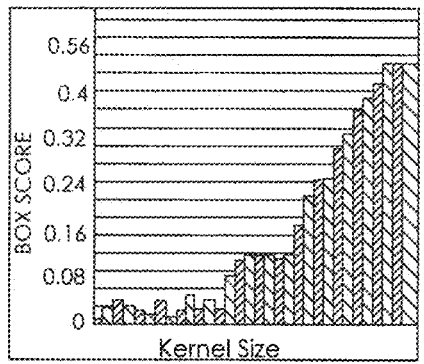

To handle multiple coronas in a frame, if the area calculated using equation (1) or the value of the identified center intensity 240 calculated using equation (2), after zeroing the pixel values of the positive portion of the DoB; solid in FIGS. 2A-2F) is above the value expected for a corona nucleus, we repeat the DoB extent determination (FIGS. 2D, 2E). In general, FIG. 2A shows two illustrative examples of UV corona discharge imagery captured at midrange camera gain in gray scale. FIGS. 2B-2F show illustrative DoB overlays of greyscale corona image, at the left) and scale space representation on the right. If the score is monotonic increasing as illustrated in FIGS. 2B and 2C, or nearly so as in FIG. 2D, a single visible-band image may be sufficient to document the discharge. In cases of multiple coronas, well-separated coronas may have a smooth but modal score through a scale space as shown in FIG. 2E, while the score may vary erratically through scale space for ambient emission or peripheral corona spray as shown in FIG. 2F. As such, through interpretation, either visually by a user, and/or via automated image analysis processes, a fault type and/or size can be identified, while the location can be determined based on a location of the camera when the corona image was captured.

Returning to FIG. 1, and as discussed above, the systems and methods discussed herein may be used to automate, or at least partially automate, infrastructure and/or power line inspections. By using UAVs equipped with one or more imaging or sensing devices, such as visible light cameras, UV cameras, UV photodetectors, IR cameras, IR photodetectors, and other similar imaging devices, inspections of large-scale electrical power transmission systems 100 may be performed to provide faster response to power outages, better prevention of electrical distribution network failures, allow for safer operation by reducing or at least limiting dangerous tasks, and may also provide cost reductions by reducing an amount of required user interaction. For example, one or more sensors and/or cameras (e.g., a still image camera, a video image camera, etc.) may be used to capture images (e.g., still images, video images, etc.) as the camera traverses components of the electrical power transmission system 100, such as by using the UAV 160, 170. Each camera or sensor may have a field of view in which images of electrical distribution system components may be captured. The images may be processed, at least partially, via a computing device installed on the UAV or may be communicated to a remote computing device for analysis, such as via one or more wireless communication links (e.g., communication link 195) to an access point 190 of communications network, such as a telecommunications system, a cellular communication system, a wide area network (WAN), a local area network (LAN) and/or via other such wireless communication systems. Using image processing techniques discussed in relation to FIGS. 2A-2F, the computing devices may process the received images and/or videos to identify a location and/or type of problem captured at the remote location. For example, the UAV may also include a location sensing device (e.g., a GPS device, a cellular model, etc.) that may be used to locate the geographical location of the UAV in relation to the electrical power distribution system. This location information, when combined with a signal indicating an orientation of the UAV device with respect to the image, can be used to determine the location of a captured electrical fault, such as corona 150, may be determined. In many cases, at least portion of the image analysis and location detection processes may be automated with the results being communicated via an alert message to a user.

Figure 4A:
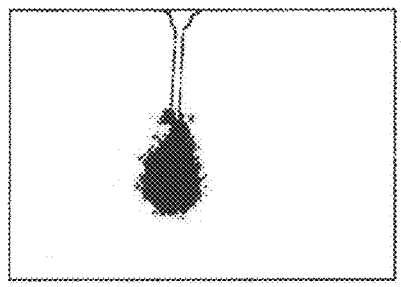
FIGS. 4A, 4B, 4C, 4D and 4E show images captured and processed during prototype testing according to aspects of this disclosure.
Figure 4C:
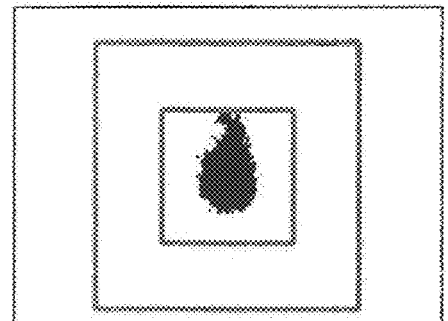
Figure 4B:
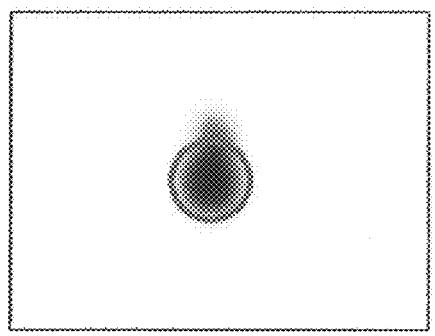
Figure 4D:
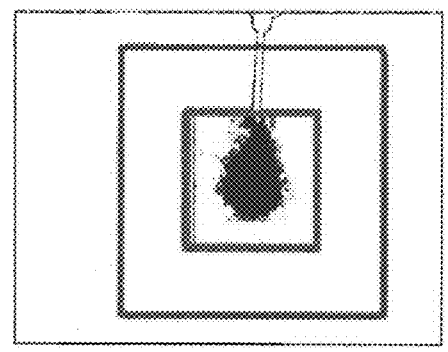
Figure 4E:
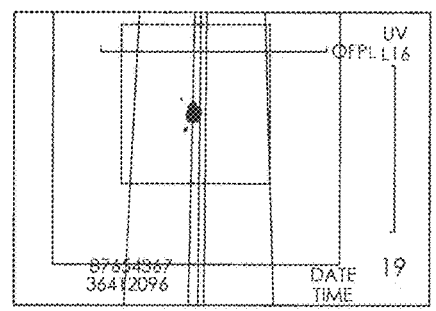

FIGS. 4A-4E show images captured and processed during prototype testing according to aspects of this disclosure. FIGS. 4A-D show gray-scale images used during the image processing process. For example, FIG. 4A shows a gray-scale visible light image with a UV image overlay, where the images are being used as an input to the image processing system. FIG. 4B shows a gray scale UV image taken from a UV video channel upon which the image analysis system has included an overlay (e.g., a circle) to identify a center of the captured corona. FIG. 4C shows a gray scale UV image of the captured corona with an overlay marking the identified boundaries of the corona, where the central box identifies a close-up inspection video and the outer box indicates an image area for use in providing the reviewer with context for the image. FIG. 4D shows an application of the overlay of FIG. 4C being applied to the gray scale of the combined visible light and UV image of FIG. 4A. FIG. 4E shows an illustrative corona on a transmission line as captured by a UAV, where this image combines a visible light image of the electrical transmission line, a UV image overlay capturing the UV emissions of the corona and an overlay including the inspection area and the contextual area as discussed in reference to FIG. 4C.

Figure 5:
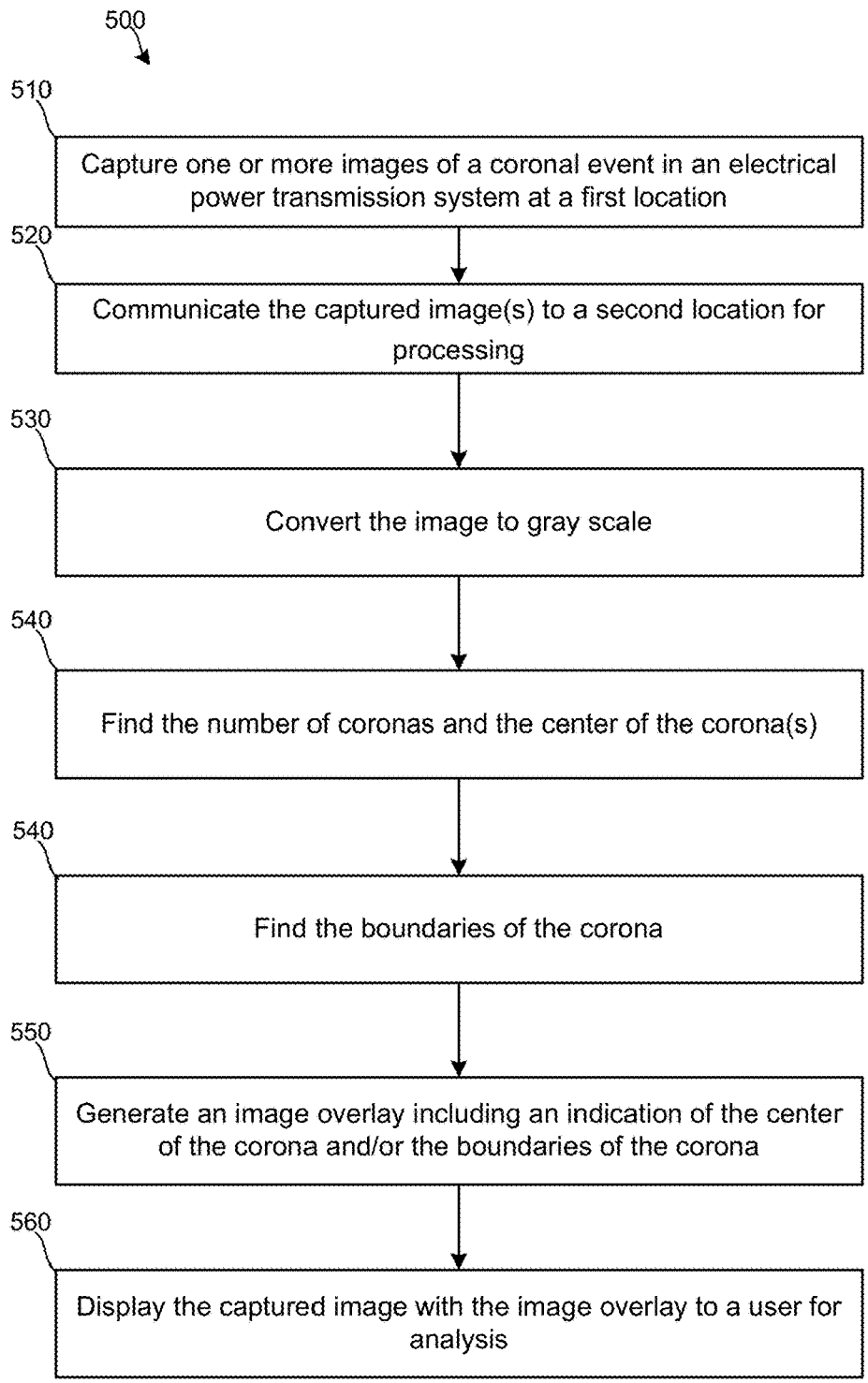
FIG. 5 shows an illustrative flow diagram of a method 500 of processing and presenting images of captured corona events to a user according to aspects of the disclosure.

FIG. 5 shows an illustrative flow diagram of a method 500 of processing and presenting images of captured corona events to a user. For example, at 510 one or more cameras or image sensors 180 installed on a UAV 160, 170, or otherwise positioned to capture a corona event in an electrical distribution system, may capture one or more still images and/or video images of a corona event. In some cases, a UAV 160, 170 may include a processor that may analyze an input signal to determine whether a corona event has occurred, such as by detecting UV light generated by the corona event. In some cases, a determination may be made when a UV light level has been detected to exceed a predetermined threshold value (e.g., 10% greater than ambient UV levels, etc.). Once a corona event has been captured, the UAV 160, 170 may communicate the one or more captured images or videos to a remote computing system via the wireless communication link 195, at 520. In some cases, at least a portion of the images may be processed locally to the UAV 160, 170, such as to convert the image to gray scale, identify a center of a corona event, and modify the rotation of the image based on an orientation of the UAV 160, 170 before communication occurs. In some cases, the one or more images may be communicated without or with minimal processing. In some cases, geographic location information, UAV orientation information and the like may be communicated via the wireless link 195 in addition to the one or more images.

Once the images and/or the additional information is received at the remote computing device, the images may be processed. For example, if not already performed remotely, the computing device may convert the raw images into gray scale images at 530. In some cases, one or more filters may be applied to generate a "clean" image of the corona event or otherwise minimize noise in the original image. At 540, the computing device may process the images, based on equations 1 or 2, as discussed above, to identify a center of the captured corona, such as by using a UV image of the corona event. In some cases, the computing device may identify a number of corona events in an image. When multiple coronas are identified, the computing device may identify a center of each of the corona events. Once the center of the captured corona event has been identified, the computing device may process one or more algorithms to identify a boundary of the corona(s) at 540. Once the boundaries and the center(s) of the coronas have been identified, at 550 the computing device may generate one or more overlays that may be applied to the captured and/or processed images to be displayed on a user display device to a user at 560. The overlays may provide an indication of a center of a corona event, a boundary of a corona event, and/or one or more commands that may be available to a user, such as by indicating a level to which the image may be enlarged or a portion of an image that may be enlarged. In some cases, an image presented to a user may include a still image with the overlay and/or a link to a video of a captured corona event. In some cases, geographic location information associated with the corona event may be presented to the user via the user interface. In some cases, the overlay information may be configured to be selectable viewable or hidden based on user input in a still image, a video, or both.

Figure 6A:
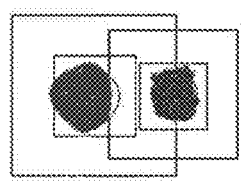
FIGS. 6A, 6B, and 6C show images associated with a relative location determination of dual corona events according to aspects of the disclosure.
Figure 6A:
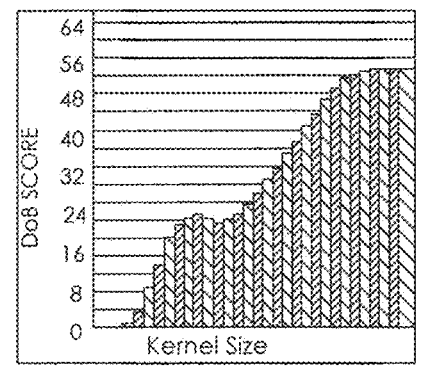
Figure 6B:
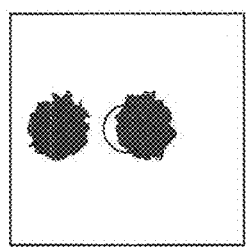
Figure 6B:
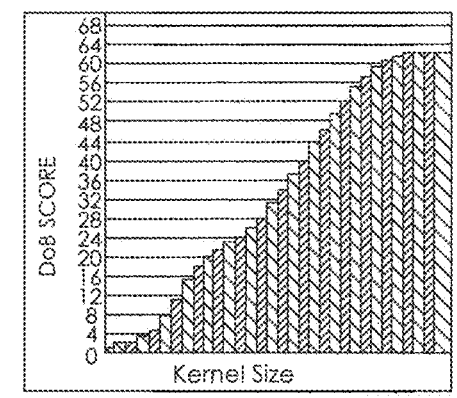
Figure 6C:
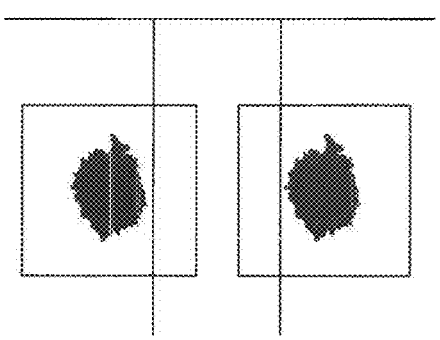
Figure 6C:
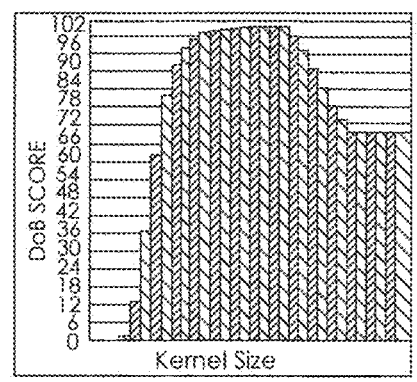

FIGS. 6A-6C show images associated with a relative location determination of dual corona events according to aspects of this disclosure. For example, FIG. 6A shows a dual corona with the processing overlay along with a scale space view having a particular shape representative of the location of the centers of the dual corona event with respect to the camera location (e.g., UAV location). FIG. 6B shows a dual corona with the processing overlay along with a scale space view having a particular shape representative of the location of the centers of the dual corona event with respect to the camera location (e.g., UAV location), where the location of the camera relative to the corona event is too far for separate identification of each corona to be possible. FIG. 6C shows a dual corona with the processing overlay along with a scale space view having a particular shape representative of the location of the centers of the dual corona event with respect to the camera location (e.g., UAV location), where the location of the camera relative to the corona event is located relatively close (e.g., closer than the image shown in FIG. 6A) enabling separate identification of each corona.

Figure 7A:
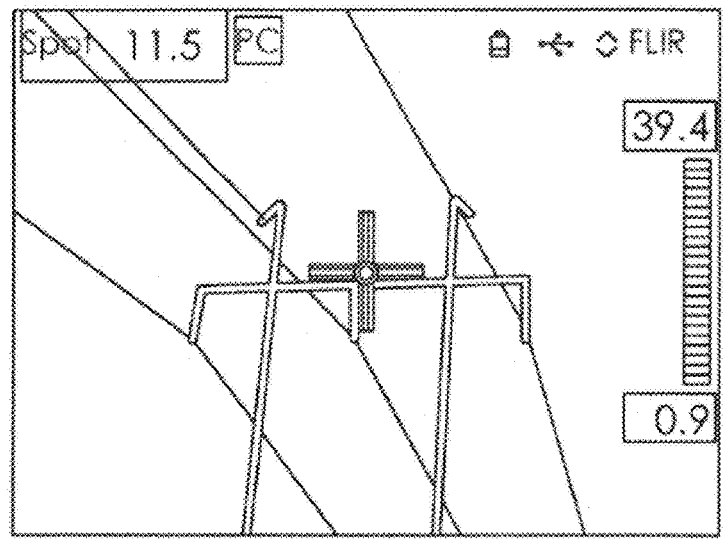
FIGS. 7A and 7B show illustrative images captured of transmission line configurations.
Figure 7B:
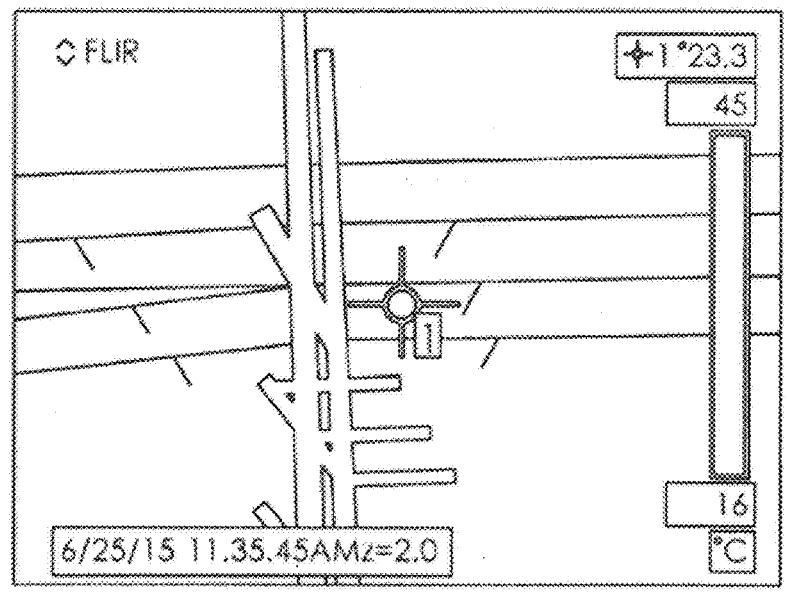

Electrical transmission lines may be supplied in multiple configurations depending on the location and/or use of the equipment at that particular location. As such, views captured via a camera may not always provide a view that is easily understood, by a human or through computer analysis. For example, FIG. 7A shows images corresponding to transmission line images that may be processed relatively easily to determine a size and/or location of a corona event. FIG. 7B, on the other hand, show images where multiple devices and/or lines are shown in a same image, thus making location of a particular corona event more difficult without additional image analysis processing and/or human interpretation to further identify the physical configuration of the electrical transmission line components.

Figure 8:
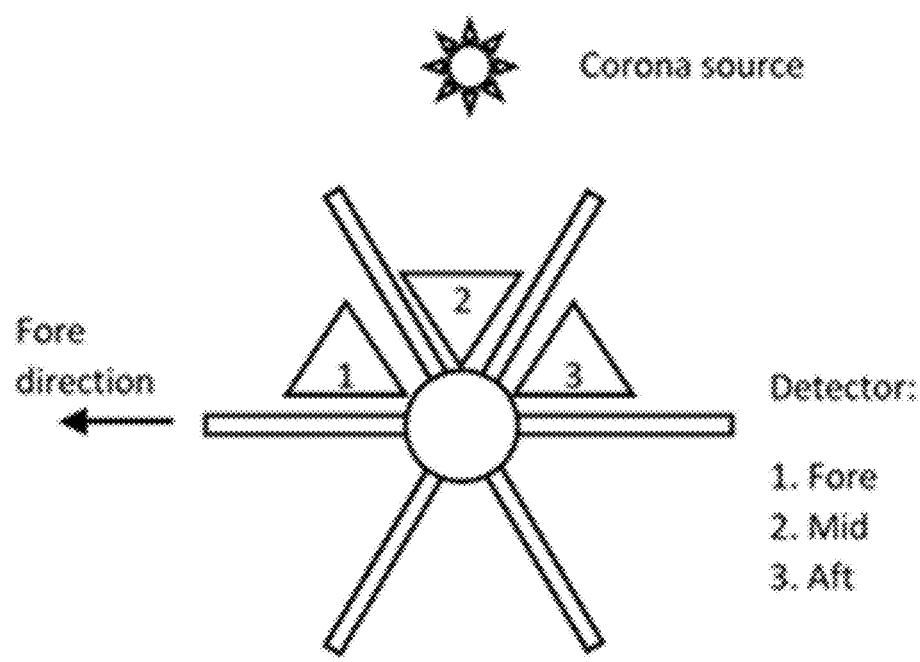
FIG. 8 shows an illustrative UAV equipped with one or more UV detection devices according to aspects of this disclosure.

FIG. 8 shows an illustrative UAV equipped with one or more UV detection devices according to aspects of this disclosure. In some cases, the UAV illustrated in FIG. 8 may correspond the one or more of the UAVs shown in FIG. 1, such as UAV 160. Here, the UAV may be configured with one or more UV photodetectors 1, 2, 3 arranged in an array along an axis of the UAV. In the illustrative case, the UV photodetectors 1-3 are arranged along the direction of travel of the UAV. In doing so, the signal strength detected by each of the UV photodetectors 1-3 may allow determination of a location of the corona event with respect to the direction of travel of the UAV and the geographic location of the UAV at the time of image capture, particularly when multiple images have been sequentially captured.

Figure 9A:
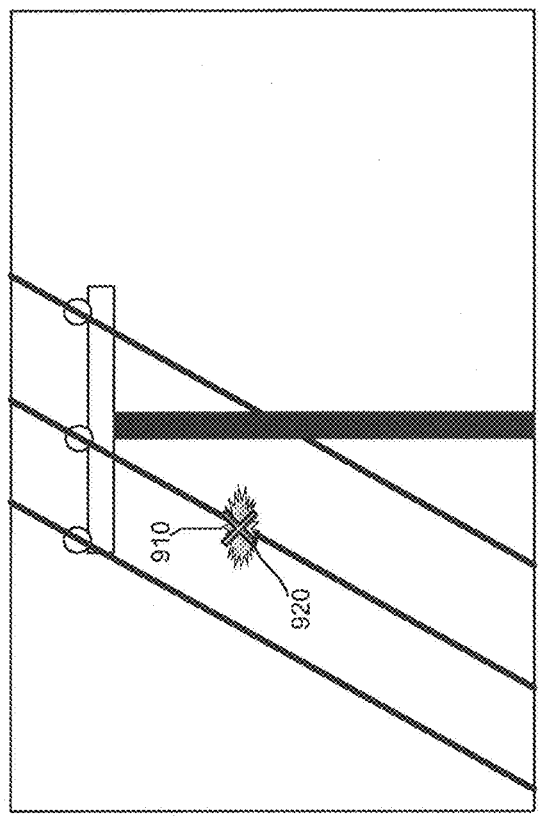
FIGS. 9A and 9B show illustrative images captured of a corona event moving along an electrical transmission line.
Figure 9A:
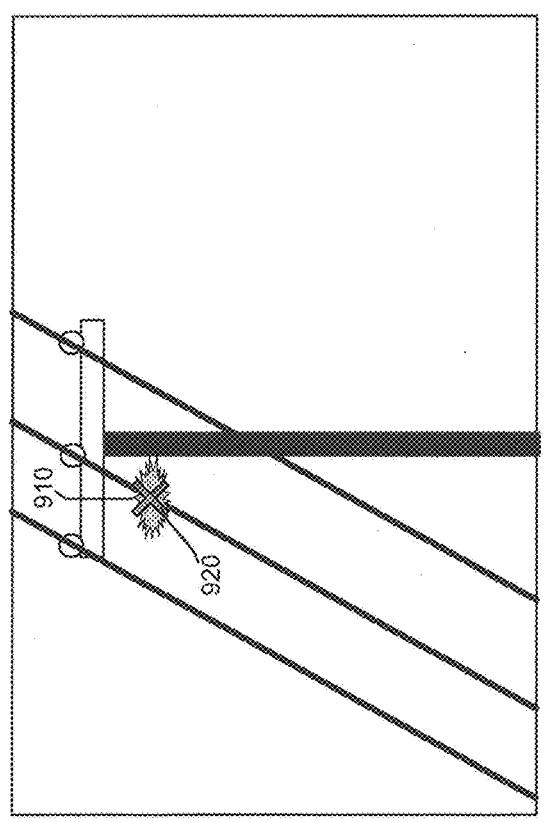
Figure 9B:
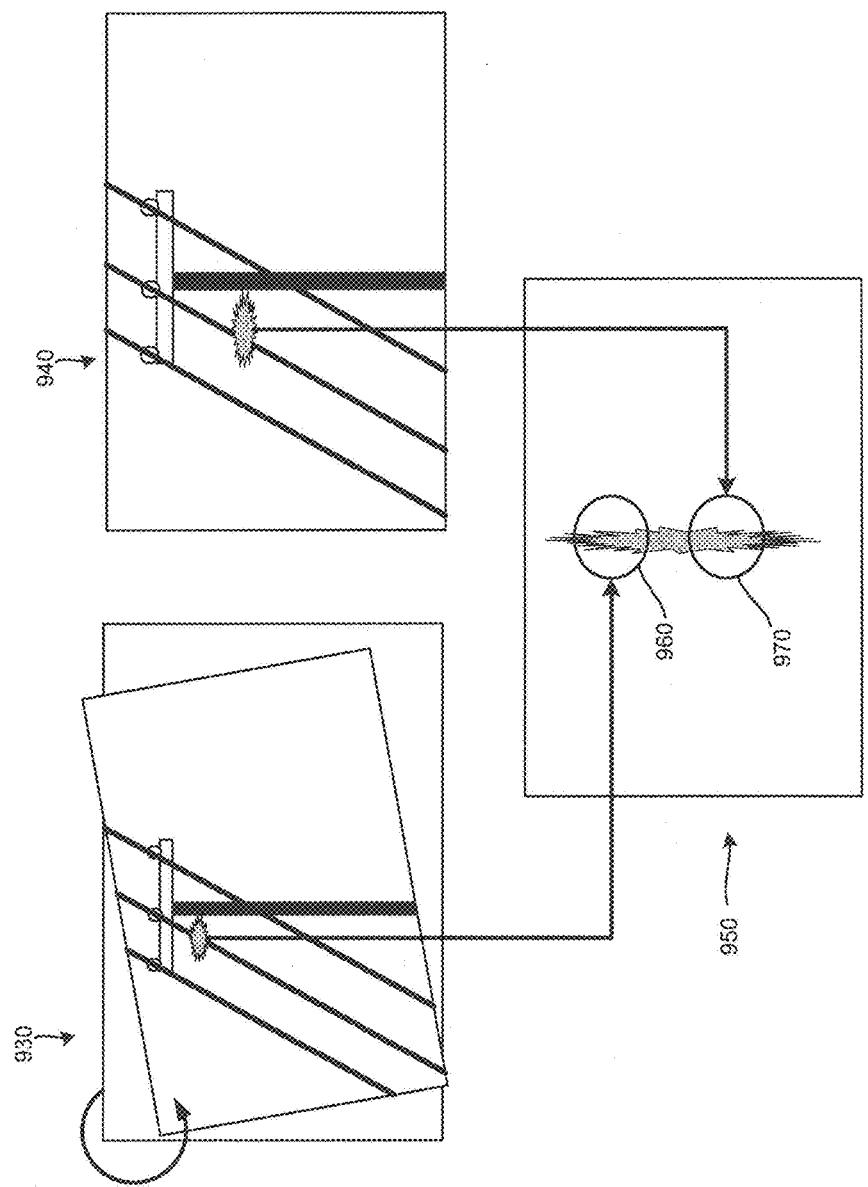

FIGS. 9A and 9B show illustrative images representative of captured of a fixed corona event while a camera is moving along an electrical transmission line. In some cases, a camera may be configured to take a video or, as illustrated here, a single snapshot with long persistence of a corona event moving along an electrical transmission line. In some cases, the camera may be configured to automatically capture such images upon detection of a corona event. The images shown in FIG. 9A show a corona event marked with an 'x' in composite UV and visual spectrum images. Image processing that may be done, either remotely or at the UAV device, may include Video stabilization which may allow for tracking of detected UV blobs. Note that the top image of FIG. 9B has been rotated so the pole in the two images has roughly the same angle. Additionally, a computing device may process the images to remove the background and/or to remove visual effects resulting from camera motion. For example, the bottom image the detected corona blobs from every frame of a video or series of still images that have been stabilized and superimposed on each other. In the instant case, the horizontal stabilization is almost perfect. The vertical movement is due to parallax, i.e., the background seems to move faster that the conductor since it is further away, which is an artifact resulting from the movement of the camera as the image was taken. Also, the circles in the bottom image show two desired camera snapshot frames. In some cases, the image processing may allow for zoom in and zoom out processing. Further, to ensure more robust operation, a UV camera having separate UV and visible video streams may be used.

What is claimed is:

1. A method for identifying a fault in an electrical distribution system using an unmanned aerial vehicle (UAV), the method comprising:

capturing an ultraviolet (UV) corona emission image of a corona event, the corona event being associated with a component of the electrical distribution system;

processing the UV corona emission image of the corona event to identify a center and a boundary of the UV corona emission image, the identified center being a UV nucleus of the UV corona emission image and the boundary demarcating an extent of the UV corona emission image;

capturing an image of the corona event in the visible band of the electromagnetic spectrum, such that the captured image includes the identified center of the UV emission image; and generating and displaying an overlay on the captured image of the corona event, the displayed overlay identifying the center and the boundary of the UV corona emission image.

2. The method of claim 1, wherein the captured image of the corona event in the visible band comprises a video.

3. The method of claim 1, wherein processing the UV corona emission image of the corona event comprises:

processing the UV corona emission image using temporal averaging using a spatial erosion method, wherein the temporal averaging comprises averaging frames over 1 second.

4. The method of claim 1, comprising: determining the boundary of the corona event based on a series of difference of box (DoB) filters having an increasing size and being centered at the center of the corona event.

5. The method of claim 1, comprising:

communicating, via a wireless communication link, the UV corona emission image of the corona event from a vehicle adjacent to the component of the electrical distribution system experiencing the corona event to a remote computing system to perform the processing and generating steps.

6. The method of claim 1, wherein the processing step is performed by a processor associated with a vehicle adjacent to the component of the electrical distribution system experiencing the corona event; and communicating the processed image, via a wireless communication network, to a remote computing device for display to a user.

7. The method of claim 1, wherein processing the UV corona emission image of the corona event includes counting a number of maxima of image intensity after Gaussian blurring.

8. A system comprising:

an unmanned aerial vehicle (UAV) configured to travel adjacent to components of an electrical distribution network;

one or more non-transitory memory devices;

at least one ultraviolet (UV) image sensor connected to the UAV;

at least one visible band image sensor;

a first processor communicatively coupled to the at least one UV image sensor and the one or more memory devices, wherein the first processor executes computer executable instructions that, when executed, cause the first processor to:

capture, via the at least one UV image sensor, an ultraviolet (UV) corona emission image of a corona event associated with at least one of the components of the electrical distribution network;

capture an image of the corona event in the visible band of the electromagnetic spectrum using the at least one visible band image sensor;

store the captured UV corona emission image and the captured visible band image of the corona event in the non-transitory memory device; and communicate, via a wireless communication link, the UV corona emission image and the captured visible band image of the corona event to a remote computing device; and the remote computing device comprising a second processor, wherein the second processor executes computer executable instructions that, when executed, cause the second processor to:

process the UV corona emission image to identify, based on a first image processing algorithm, a center of the corona event, the identified center being a UV nucleus of the UV corona emission image;

identify, based on a second image processing algorithm, a boundary of the corona event, the boundary demarcating an extent of the UV corona emission image; and generate and display an overlay on the captured image of the corona event, the displayed overlay identifying the center and the boundary of the UV corona emission image.

9. The system of claim 8, wherein the image of the corona event in the visible band comprises a video.

10. The system of claim 8, wherein the second processor executes computer further executable instructions that, when executed, cause the second processor to:

process the UV corona emission image of the corona event using temporal averaging based on a spatial erosion method, wherein the temporal averaging comprises averaging frames over 1 second.

11. The system of claim 8, wherein the second processor executes computer further executable instructions that, when executed, cause the second processor to:

determine the boundary of the UV corona emission based on a series of difference of box (DoB) filters having an increasing size and being centered at the identified center.

12. The system of claim 8, wherein the UAV further comprises a geographic location determination device configured to determine a location of the UAV when the UV corona emission image was captured, wherein the first processor executes computer executable instructions that, when executed, cause the first processor to:

communicate, via the communication link, information identifying the location of the UAV when the UV corona emission image was captured.

13. The system of claim 8, wherein the second processor executes computer further executable instructions that, when executed, cause the second processor to:

process the UV corona emission image of the corona event by counting a number of maxima of image intensity after Gaussian blurring.

\* \* \* \* \*